US009409339B2

(12) United States Patent
Annet

(10) Patent No.: US 9,409,339 B2
(45) Date of Patent: Aug. 9, 2016

(54) SCREW INTENDED FOR THE EXTRUSION OR MIXING OF ELASTOMERS AND METHOD FOR FITTING SAME

(75) Inventor: Pierre Annet, Clermont-Ferrand (FR)

(73) Assignees: COMPAGNIE GENERAL DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 154 days.

(21) Appl. No.: 13/982,447

(22) PCT Filed: Feb. 6, 2012

(86) PCT No.: PCT/FR2012/050256
§ 371 (c)(1),
(2), (4) Date: Oct. 3, 2013

(87) PCT Pub. No.: WO2012/107678
PCT Pub. Date: Aug. 16, 2012

(65) Prior Publication Data
US 2014/0017351 A1   Jan. 16, 2014

(30) Foreign Application Priority Data
Feb. 9, 2011   (FR) .................................. 11 51039

(51) Int. Cl.
*B29C 47/08*   (2006.01)
*B29C 47/60*   (2006.01)
*B30B 11/24*   (2006.01)
*B29C 47/38*   (2006.01)
(Continued)

(52) U.S. Cl.
CPC ........... *B29C 47/6012* (2013.01); *B29C 47/082* (2013.01); *B29C 47/0825* (2013.01);
(Continued)

(58) Field of Classification Search
CPC .............. B29C 47/0818; B29C 47/082; B29C 47/0825; B29C 47/0844; B29C 47/38; B29C 47/60; B29C 47/6012
See application file for complete search history.

(56) References Cited

U.S. PATENT DOCUMENTS 4,202,633 A    5/1980   Anders
4,838,700 A *  6/1989   Williamson ................... 366/89
(Continued)

FOREIGN PATENT DOCUMENTS

CN   101849116   9/2010
DE   11 90 266 B   4/1965
(Continued)

OTHER PUBLICATIONS

International Search Report (PCT/ISA/210) issued on Jun. 19, 2012, by the French Patent Office as the International Searching Authority for International Application No. PCT/FR2012/050256.
(Continued)

*Primary Examiner* — Yogendra Gupta
*Assistant Examiner* — Joseph Leyson
(74) *Attorney, Agent, or Firm* — Dickinson Wright PLLC

(57) ABSTRACT

The screw is intended for the extrusion or mixing of elastomers or plastic products. It comprises:
  a support,
  at least one sleeve having at least one relief projecting from an external face of the sleeve, and
  at least one split annular securing member, the member being clamped between the sleeve and the support in a radial direction with respect to an axis of the screw so as to secure the sleeve rigidly to the support.
The member and the sleeve have frustoconical faces in mutual contact.

10 Claims, 4 Drawing Sheets

(51) Int. Cl.
  *B29C 47/00*     (2006.01)
  *B29K 21/00*     (2006.01)

(52) U.S. Cl.
  CPC ............. *B29C47/0844* (2013.01); *B29C 47/38*
       (2013.01); *B29C 47/60* (2013.01); *B30B*
       *11/246* (2013.01); *B29C 47/0009* (2013.01);
       *B29C 47/0818* (2013.01); *B29K 2021/00*
       (2013.01)

(56)       References Cited

U.S. PATENT DOCUMENTS 5,314,245 A * 5/1994 Blach ............................ 366/79
  2010/0202823 A1 8/2010 Dizdarevic

FOREIGN PATENT DOCUMENTS

| DE | 27 40 028 A1 | 3/1979 |
| DE | 297 06 744 U1 | 5/1998 |
| DE | 20 2007 010709 U1 | 12/2008 |
| DE | 10 2007 050 466 A1 | 4/2009 |
| EP | 1 262 303 A1 | 12/2002 |
| WO | WO 02/20257 A1 | 3/2002 |

OTHER PUBLICATIONS

Office Action for corresponding Chinese Application No. 201280007924.3 dated Jan. 7, 2015.

* cited by examiner

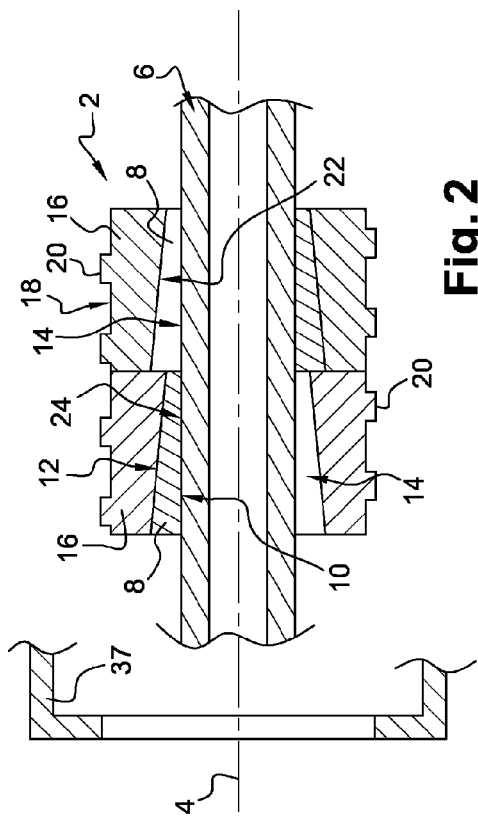
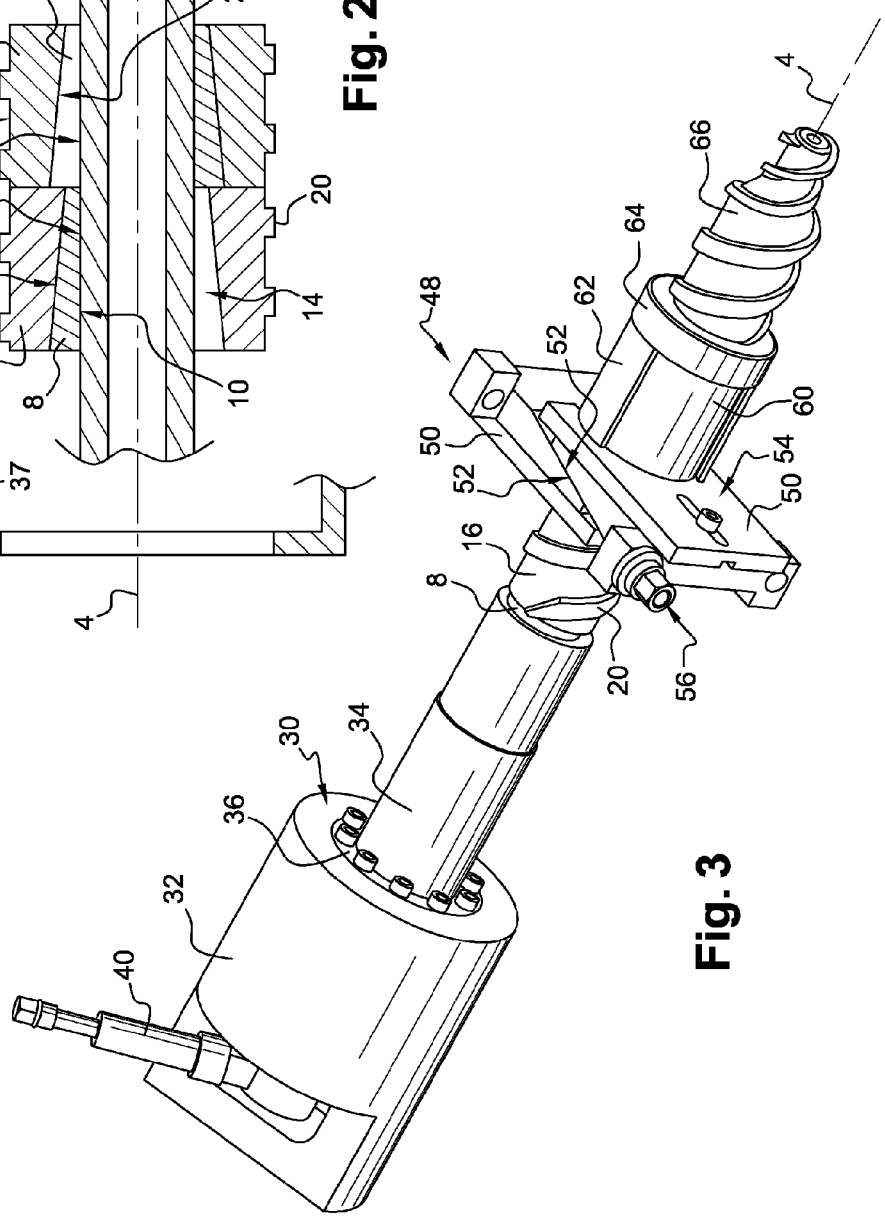
Fig. 2
Fig. 3

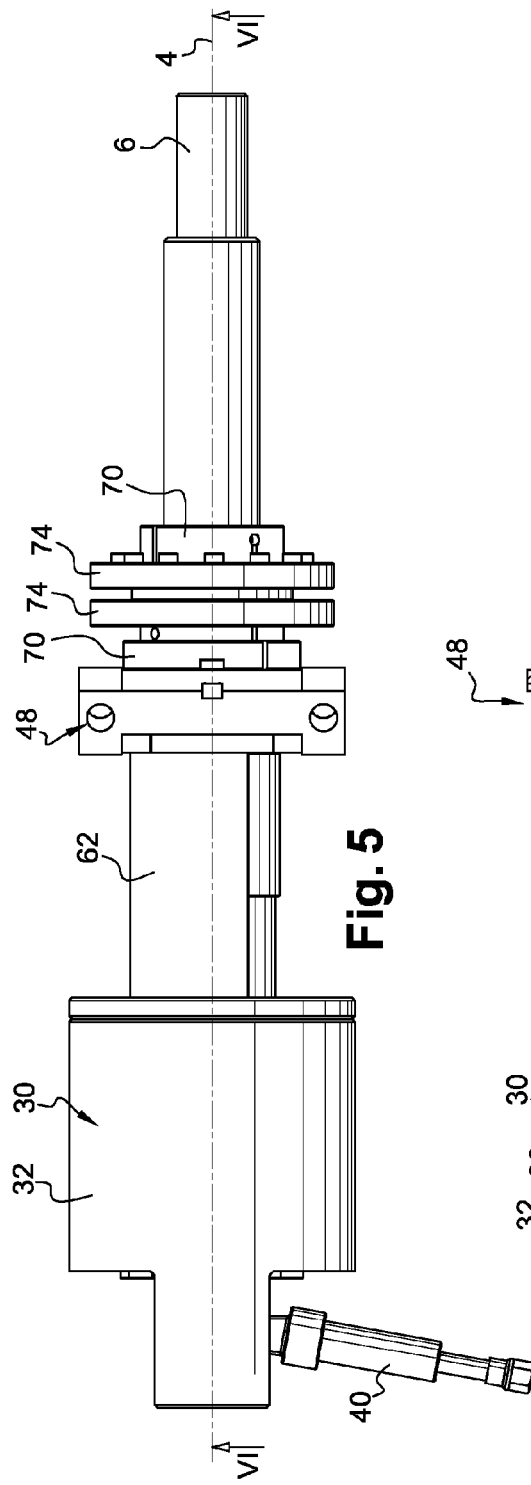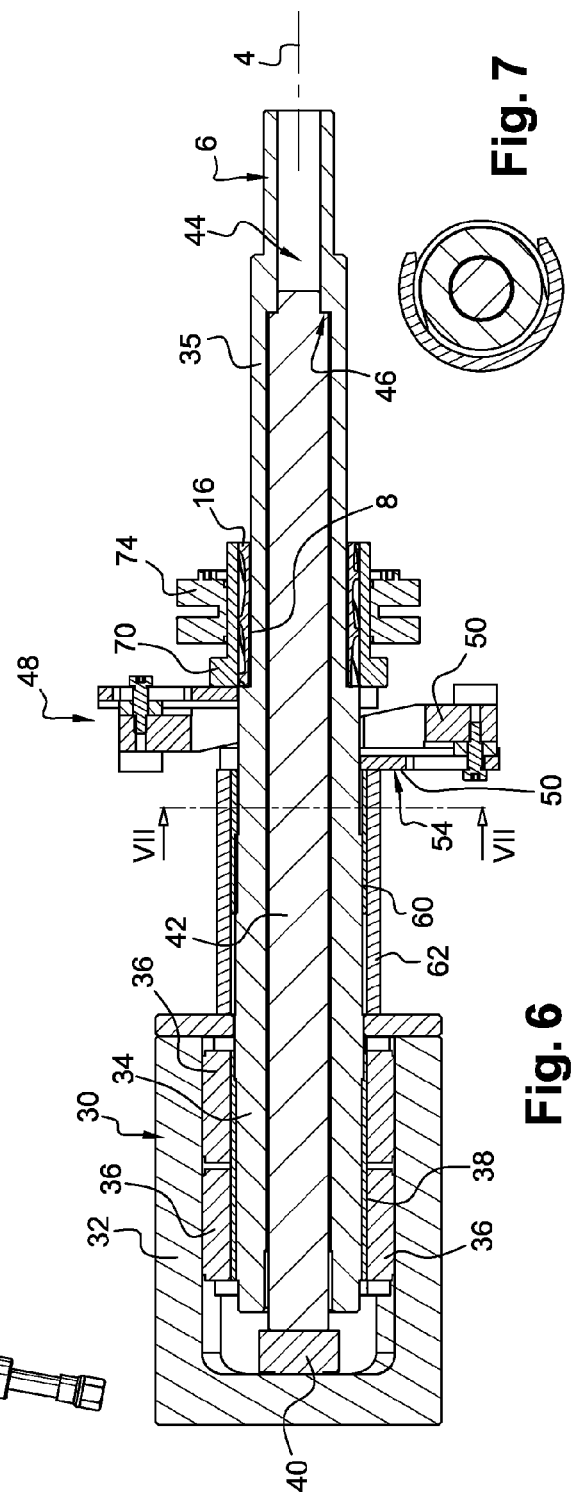

SCREW INTENDED FOR THE EXTRUSION OR MIXING OF ELASTOMERS AND METHOD FOR FITTING SAME

BACKGROUND

1. Field

The invention relates to devices for the extrusion or mixing of elastomers or plastic products, in particular for the manufacture of tires for wheels.

2. Description of Related Art

A device for the extrusion of elastomers or plastic products conventionally comprises an extrusion screw accommodated in a cavity of a cylinder. The screw exhibits different reliefs, in particular one or a plurality of threads, of which the functions are variable along the length of the screw. The pitch of the thread is thus relatively short in one section of the screw, so that its principal function is to place the rubber under pressure inside the cavity. In another section the thread exhibits a medium pitch, which increases the speed of the rubber. Finally, in another section, the screw exhibits reliefs such as fingers or cutting blades, the principal function of which is to mix the different constituents of the rubber.

Screws of different configurations are used depending on the type of tire to be manufactured and the nature of the rubber. Rather than replacing the screw in its entirety, consideration has been given to its execution in the form of a shaft receiving movable sleeves having reliefs intended to be in contact with the rubber. Depending on the requirements of the manufacturing process, one or other sleeves are arranged on the shaft in order to obtain the desired configuration of the screw, yet without having to replace the screw in its entirety. This arrangement also has the advantage of permitting the replacement of any one of the sleeves when it becomes worn or defective, while retaining the others.

A keyway fitting or even a cylinder-to-cylinder fitting with radial teeth is used as a general rule in order to secure each sleeve rigidly to the shaft of the screw. However, the forces to which the sleeve is subjected when in contact with the rubber are concentrated in the key, which thus presents a high risk of fracture. Furthermore, securing by means of a key has been found to be inappropriate on those sections of screws where the sleeve has a particularly small diameter.

SUMMARY

One object of the invention is to make available another method of fitting sleeves on the screw.

For this purpose, provision is made according to the invention for a screw intended for the extrusion or mixing of elastomers or plastic products, which comprises:
a support,
at least one sleeve having at least one relief projecting from an external face of the sleeve, and
at least one split annular securing member, the member being tightened between the sleeve and the support in a radial direction with respect to an axis of the screw so as to secure the sleeve rigidly to the support, the member and the sleeve having frustoconical faces in mutual contact.

Thus, thanks to the tight fit of the annular securing member, the forces transmitted by the sleeve are distributed over the whole of this member without the risk of fracturing it. In addition, this method of rigid securing of the sleeves is compatible with all sleeve diameters, and in particular the smallest, for which it has been found to be highly advantageous.

Furthermore, the frustoconical faces facilitate the attachment of the member and the sleeve to one another as well as their disassembly. In particular, these two elements may be pre-assembled by hand by being placed in contact one with the other and overlaid for the largest part of their length. Only the final tightening is carried out by means of a tool. Furthermore, the fact that the securing member is split means that it has the ability to open to a greater or lesser extent in order to adapt to the respective diameters of the sleeve and of the section of the support between which it is radially interposed. In other words, the member is not restricted in the circumferential direction. Under these conditions, the tightening forces imposed by the bringing into contact of the member and the sleeve are suitably transmitted to the support.

The sleeve, or at least one of the sleeves, preferably exhibits a wall thickness smaller than or equal to 10 mm and preferably smaller than or equal to 3 mm.

This small thickness improves the transmission of the tightening forces, which are thus diffused over the whole of the circumference of support. In operation, the driving torque of the screw may suitably pass from the support to the member, and then to the sleeve.

The securing member is advantageously split in a parallel direction with respect to the axial direction of the member.

Provision can be made for the securing member to exhibit at least two splits, for example at least four splits.

The presence of a relatively high number of splits facilitates the deformation of the member.

The splits, or at least two of the splits, advantageously extend from the respective different end edges of the member.

This helps to improve the good distribution of the deformation in the member.

The member preferably exhibits a total length lower than a total length of the sleeve.

The sleeves can thus be placed in abutment one against the other in the direction of the axis of the screw in order to prevent the passage of materials between the sleeves, and without the members similarly coming into mutual abutment and thereby obstructing the abutment of the sleeves.

The securing member is preferably in contact with the sleeve via a single frustoconical contact face of the member.

Similarly proposed according to the invention is a device for the extrusion or the mixing of elastomers or plastic products which comprises a screw according to the invention.

Also proposed according to the invention is a method for the assembly of a screw intended for the extrusion or mixing of elastomers or plastic products, in which a split annular securing member is tightened in a radial direction with respect to an axis of the screw between a support and a sleeve having at least one relief projecting from an external face of the sleeve, such that the member and the sleeve are in mutual contact via frustoconical faces of the member and the sleeve and so as to secure the sleeve rigidly to the support.

The sleeve is preferably press-fitted on the support.

The support is advantageously extended.

This is a convenient method for the implementation of the press fit. In fact, if the support is extended during tightening of the securing member and the sleeve on the latter, the eventual completion of the extension will generate essentially axial, but also radial, residual stresses between the three elements, which are responsible for compression and particularly intense tightening between the latter and, as a result, a reliable rigid mounting.

A distal section of the support is pushed by means of an internal plunger emerging from the proximal section and in abutment against the distal section, preferably by bearing against a proximal section of the support, for example against a bushing that has been made integral with the support, or against an annular securing member tightened onto the terminal section screwed to the support.

This method of implementation of the extension has the advantage of being secure and of leaving the exterior of the distal section clear in order to be able to feed on pieces or fitting tools at that point.

Preferably, the member is fitted on the support, and the sleeve is then pushed onto the member.

The sleeves, being at least two in number, are advantageously fitted on the support in such a way that, once the assembly has been completed, the sleeves are in mutual axial compression.

Accordingly, the risk of the intrusion of material between the members and the sleeves at the time of using the screw is limited in this way. This compression may result in residual compression stresses between the sleeves in the axial direction if fitting has been carried out by extending the support.

Also proposed according to the invention is a method of disassembly of a screw according to the invention in which the support is extended.

In the same way as for fitting, the extension facilitates the extraction of the sleeves and the securing members.

BRIEF DESCRIPTION OF DRAWINGS

Other characteristics and advantages of the invention will become more apparent in the following description of an embodiment and of a variant provided by way of non-limitative examples with reference to the accompanying drawings, in which:

FIG. 2 is a view in axial cross section illustrating the principle of a part of the screw in FIG. 1 in the fitted state, FIG. 3 is a perspective view of the screw in FIG. 1 and of an assembled installation illustrating the method of fitting the sleeves onto the screw, FIG. 4 is a view similar to FIG. 3 illustrating the method of disassembly of the screw, FIG. 5 is a view from the side of the installation in FIG. 4, FIGS. 6 and 7 are views in axial and transverse section respectively according to the planes VI-VI and VII-VII of the installation in FIGS. 5 and 6.

DETAILED DESCRIPTION OF SPECIFIC EMBODIMENTS

Figure 1:
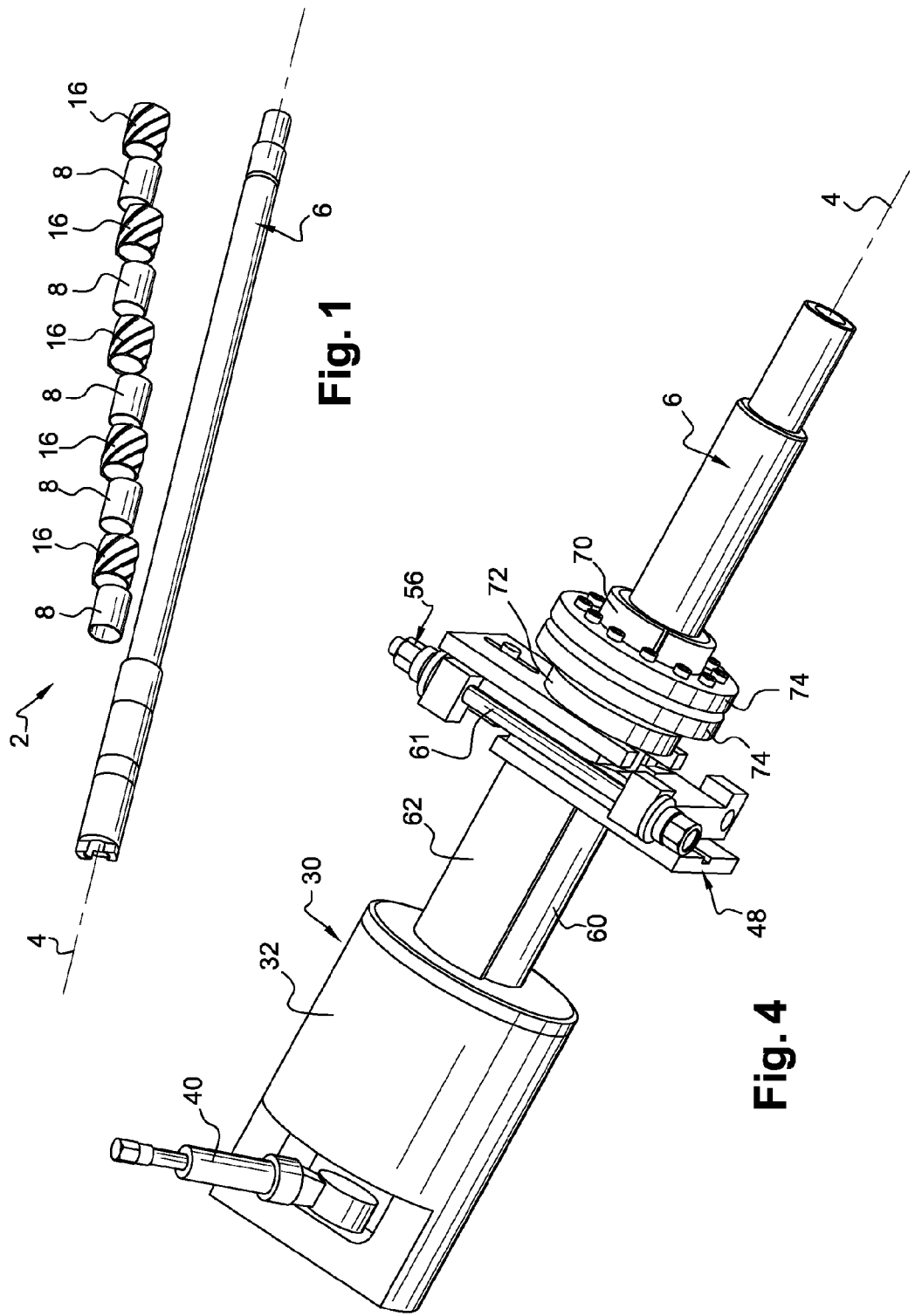
FIG. 1 is an exploded perspective view of an extrusion screw according to one embodiment of the invention.

Illustrated in FIGS. 1 and 2 is a screw 2 being part of a device for the extrusion of rubber used in the manufacture of tires for wheels. These wheels are intended, for example, for passenger vehicles, light goods vehicles, utility vehicles, vehicles of the heavy goods type or even for civil engineering machinery. The rubber is composed of, for example, a mixture of natural rubber, synthetic rubber, reinforcing fillers, additives and oil. One of the functions of the screw may also be to perform at least a part of the mixing of the ingredients inside the extrusion device.

The screw 2 is of generally elongate shape having rotational symmetry about a longitudinal axis 4 of the screw. The screw comprises a support 6, in the present case in the form of a hollow mandrel comprising a succession of sections having external and internal cylindrical faces of circular section in a plane perpendicular to the axis 4, the sections having different external and internal diameters in relation to each other. The mandrel 6 in its entirety is illustrated in section in FIG. 6.

The screw comprises a plurality of annular securing members 8 having the general form of a sleeve, with rotational symmetry. In the present case, each member 8 exhibits one internal cylindrical face 10 of circular section in a plane perpendicular to the axis 4, and one external frustoconical face 12. The cylindrical and frustoconical faces are coaxial. Each member 8 exhibits in addition in the present example at least one longitudinal split or groove 14, in the present case of plane form passing radially through the member from one side to the other and extending in the axial direction of the member. In the case of a single groove, this extends from one of the axial extremities of the member to the other. In the case of a plurality of grooves, these grooves extend alternately from one axial edge and then from another but without reaching as far as the opposite edge. The member 8 is extendable in the radial direction, however.

The screw comprises in addition working sleeves 16 having a generally annular form with rotational symmetry of the axis 4. Each sleeve 16 exhibits an external cylindrical face 18 of circular form in a plane perpendicular to the axis 4, and an internal frustoconical face 20, the faces 18 and 20 being coaxial. Unlike the members, the sleeves are not split. The external face 18 carries one or a plurality of reliefs projecting from the said face, such as a thread 20 of the kind illustrated in FIG. 2. These reliefs are intended to be in contact with the rubber at the time of using the screw, the faces 18 constituting external faces.

As can be seen in the present example, the member and the sleeve each have a single frustoconical face, these two faces being intended to come into mutual contact.

For the purpose of standardisation, the members 8 are identical with each other as a general rule. The sleeves 16 and the members 8 are equal in number and are respectively associated in a bijective manner. Each sleeve has essentially the same length as the associated member.

For mechanical reasons, however, arrangements should preferably be made for each member to have a length that is slightly smaller, for example by 0.5 mm, than the length of the associated sleeve.

The internal face 10 of each member 8 and the external face 24 of the mandrel 6 receiving it are coaxial, concentric and in surface contact one with the other. These two faces are dimensioned so as to produce an interference fit or a shrink fit of the member 8 on the mandrel, the said fit being sufficient to ensure a robust rigid mounting of the member on the mandrel.

It should be noted here that, due to the presence of the longitudinal splits 14, the member 8 is capable of sliding freely on the mandrel before receiving the sleeve 16.

The fit is executed in such a way that each sleeve, the associated member and the mandrel are coaxial, the member being interposed between the sleeve and the mandrel in the radial direction with respect to the axis 4. The frustoconical faces 22 of the sleeve and 12 of the member are in surface contact one with the other, the angles at the apex of the two cones being selected to be identical for this purpose. In addition, the sleeve and the corresponding member are dimensioned so as to provide an interference fit which is capable on its own of ensuring the rigid securing of the sleeve to the member and, therefore, also to the mandrel. The sleeves succeed one another along the length of the mandrel in the direction of the axis 4 by being in mutual contact and in abutment in the axial direction. By reason of having an axial length that is slightly smaller than the length of the sleeves 16, the members 8 do not come into contact with each other, in order to permit the axial tightening of only the sleeves 16 one against the other.

Each securing member 8 is fed onto the mandrel 6 in the direction of the axis 4, and coaxially in relation to the latter, at the same time as the sleeve 16 that is associated with it. This operation is repeated for the same number of times as the number of sleeves to be fitted so that, when fitting is complete, the sleeves 16 are in abutment against one another via their axial end faces.

A series of reliefs 20 is thus constituted along the length of the screw in order to ensure, in accordance with the specific characteristics of the envisaged manufacturing process, the mixing, the acceleration or even the placing of the extruded rubber under pressure by the screw. The sleeves 16 may preferably be different one from the other in order respectively to ensure one or other of these functions.

The screw is accommodated in a cavity of a device 37 for the extrusion of the rubber.

We will now describe in more detail and with reference to FIGS. 4 to 7 the fitting of the screw with its members 8 and its detachable sleeves 16, and then its disassembly with a view to the replacement of one of its parts.

The installations envisaged for this purpose comprise means 30 for extending the mandrel 6 in the direction of its axis 4. These means in the present case comprise a cover 32 of generally cylindrical form closed at its left-hand extremity in FIG. 6 and open at its right-hand extremity. The cover exhibits a cylindrical wall by means of which it is rigidly attached to the part 34 of the axial extremity of the mandrel forming its proximal part, coaxially with the mandrel. For this purpose, the part 34 penetrates into the cavity defined by the cover. This attachment is achieved here by one or a plurality of rings 36, for example those marketed under the name RingSpan, which are capable of applying compression in the direction of their axis. In the present case, two rings 36 are arranged one after the other in the direction of the axis 4. A protection bushing 38 is interposed in the radial direction with respect to the axis 4 between each of the rings and the mandrel, the said bushing being in direct contact with the mandrel and each of the rings. The rings are in direct contact via their external face with the internal face of the cylindrical wall of the cover.

The means of extension in addition comprise an actuator 40 constituted in the present case by a cylinder, in the present case being a grease cylinder, interposed in the axial direction between the base of the cover 32 on the one hand and the proximal extremity of a plunger 42 on the other hand. The latter has a rectilinear elongate shape having rotational symmetry and extends coaxially inside a housing 44 for the circulation of water for the mandrel. The mandrel exhibits on a section of its distal extremity 35 an internal shoulder 46, against which a shoulder of the distal extremity of the plunger 42 comes to bear in the axial direction. In so doing, by bearing against the base of the cover, the actuator 40 causes the proximal extremity 34 of the plunger to move in the axial direction in order to distance it from the base of the cover and thus similarly causes its distal extremity as well as the distal end part 35 of the mandrel to move in the same direction in order to distance it from the cover. Considering that the proximal part 34 of the mandrel is additionally supported in the opposite direction by the cylindrical wall of the cover, an extension of the mandrel between its proximal and distal parts is realized in this way.

With reference to FIG. 3, the fitting of the securing members and the working sleeves onto the mandrel takes place as follows.

Let us assume that it is wished to put in place the member and the sleeve which occupy the position closest to the proximal part 34 of the mandrel, and that the latter is extended along its axis 4 as explained above.

The member 8 is fed, for example manually, as far as the desired position on the mandrel. This positioning is facilitated by the one or more splits in the member 8, which allow it to open while it slides on the mandrel. The member is installed in such a way that the narrowest section of its frustoconical face 12 is present on the side of the distal part of the mandrel.

The associated working sleeve is now fed onto the mandrel and then onto the member by placing the two frustoconical faces 12, 22 in contact one with the other, but without pushing the sleeve as far as its final position on the cone.

A thrust member 48 comprising two plates 50 extending generally in planes perpendicular to the axis 4, superimposed one on top of the other in this direction and in mutual contact via internal faces 52 parallel one to the other but inclined in relation to the axis 4, is then fed onto the mandrel 6. The two plates have central holes permitting them to be fed onto the mandrel, the said holes in the present case opening onto one side of the plate in order to permit the lateral installation of the plates on the mandrel. The plates have principal external faces 54 perpendicular to the axis 4, of which one bears against the distal extremity of the sleeve that it is wished to position. The thrust member 48 comprises a tightening element 56 illustrated fully in FIG. 4. This element comprises in the present case a threaded rod 61 extending in a plane perpendicular to the axis 4 and at a distance from the latter. The respective extremities of the rod are secured by nuts to the respective plates, so that the actuation of the nuts in order to bring them closer together produces the sliding of the faces 52 one against the other and, due to the wedge action, the separation of the external faces 54 one from the other.

A locking bushing 60 is then fed onto the mandrel and above the latter a support bushing 62, each extending for a little more than a half-turn about the axis 4 while being laterally open. These two bushings are locked together by the rotation of one bushing about the other. The two bushings are arranged in such a way that, together, they extend for a complete perimeter of the mandrel in a plane perpendicular to the axis 4. The locking bushing is used to maintain the support bushing in position and closes the lateral opening of the latter internally.

A thrust ball bearing 64, or even a thrust washer, is then fed onto the mandrel.

An end piece such as a torpedo 66, which is thus rigidly secured to the mandrel, is then screwed onto the threaded distal extremity of the mandrel.

The following pieces bear one against the other in the axial direction and in this order: the sleeve 16, one of the plates 50, the other plate 50, the support bushing 62, the thrust ball bearing 64 and the torpedo 66.

The actuation of the thrust member 56 which causes the plates to move closer one to the other thus produces, due to the wedge action, a distance from the external faces of the latter. Because the distal plate is immobilized in the axial direction by the torpedo 66, it is the other plate which produces the thrust of the sleeve in the direction of the cover 32 until it reaches its nominal position on the member 8. The shrink fit of the sleeve on the member and of the latter on the mandrel, which produces the rigid attachment of these pieces, are assured by means of this operation.

The torpedo 66, the abutment 64, the bushings 60 and 62 and the member 48 are removed for the positioning of the following member 8 in the succession. The member 8 and the corresponding sleeve 16 are then fed on, and the previous procedure is then adopted, although the bushings 62 and 60 are replaced with shorter bushings. Since the tensioning of the mandrel is carried out entirely from the exterior of the proximal extremity of the latter, the distal extremity remains unobstructed for the feeding on or removal of pieces.

Once all the members and the sleeves are in place, the extension is interrupted and the means intended for this purpose are removed. The relaxation of the mandrel causes the axial compression of the sleeves 16 one against the other and their rigid immobilisation. In addition, this compression limits the intrusion of rubber between the sleeves at the time of using the screw.

It is also possible to make provision for the tension of the mandrel to be maintained by the final tightening of the torpedo 66, and before eliminating the extension of the latter. In the present case, the thrust ball bearing 62 makes it possible for the torque generated on the screw by the tightening of the torpedo 66 on the mandrel not to be transmitted in the direction of the proximal extremity.

The screw may then be installed in the device for extrusion or mixing intended to be used in the manufacturing of the profiled elements of rubber that are used in the assembly of a tire.

The method of disassembly of the screw takes place as follows.

The extension of the mandrel is performed with the means 30 already described.

Illustrated in FIGS. 4 to 6 is the situation in which the sleeve and the member that it is wished to remove are situated closest to the proximal extremity of the mandrel, the other members and sleeves having been previously removed. The small thickness of the member 8 means that it is not readily visible in FIG. 6.

A protection washer 70 is installed against the distal extremity of the cover bearing axially against the latter.

A locking bushing 60 is installed, and a support ring 62 is then installed above the latter in the same way as during the fitting operation, except that on this occasion the support bushing is placed in axial abutment against the means of tightening 30.

The thrust member 48 is positioned in such a way that the proximal plate is in axial abutment against the support bushing.

The protection bushing 70 has a proximal extremity which is augmented by a sleeve projecting from the external face of the bushing, which sleeve bears axially against the distal plate of the thrust member 48. An internal cylindrical face of the bushing bears radially against the reliefs 20 of the sleeve 16 at a plurality of points around the circumference of the sleeve and along the latter.

One or a plurality of compression rings 74 such as those described above are installed on the bushing. These rings, in the present case being two in number, are arranged side-by-side and succeed one another along the length of the axis 4. Each ring bears against the external cylindrical face of the bushing 70 so as to place the latter radially in compression in order to ensure a robust rigid mounting through the friction of the bushing 70 on the sleeve 16.

The actuation of the thrust member 48 causes the separation, due to the wedge action, of the pieces bearing against it. Since the proximal plate is immobilized by bearing against the cover, it is the distal plate which moves and which pushes the protection bushing with the sleeve 16 in the direction of the distal extremity of the mandrel. The sleeve is thus situated at a distance from the securing member. Once a sufficient distance has been achieved, the rings 74 and the protection bushing 70 can be removed, and it is then possible to complete the disassembly by hand of the sleeve 16 followed by the securing member 8.

The preceding disassembly of the other sleeves and members has already been carried out in the same way. It is proposed, however, to replace the bushings 60 and 62 with longer bushings additionally covering the sleeves that are still secured, with the exception of the one that is to be disassembled. It should be noted that each member 8 from which the sleeve 16 has been removed is pushed by the following sleeve at the time of the disassembly of the latter, because of the frustoconical forms of these pieces.

If the coefficients of expansion of the materials that are present permit this, the fitting and the disassembly of the pieces can also be facilitated by heating the screw, instead of extending it.

Non-limiting examples concerning the dimensional characteristics of the various pieces are provided below:

mandrel:
    external diameter receiving the members and the sleeves: 67 mm
    tolerance: g6 (−10/−29 μm)
    surface state: Ra 0.8 securing member 8:
    internal diameter: 67 mm
    tolerance: −0.03, −0.05 mm
    angle at the vertex of the external face: 1°
    largest diameter of the external face: 69.7 mm sleeve 16:
    angle at the vertex: 1°
    smallest diameter of the external face: 68 mm
    provision should be made to obtain an overrun of 3 to 7 mm in the axial direction by the frustoconical face of the sleeve in relation to the member before tightening.

After fitting, the surface pressure giving rise to the tightening forces of the sleeve, of the member and of the mandrel lies between 17 and 29 MPa.

The materials used may be the following, for example:
mandrel 6: steel under reference APX 4 supplied by Sté Aubert and Duval, or steel under reference 4418 from Sté Ugine.

securing member: tubular preform in extruded stainless steel, hot-finished without welding.

Figure 8:
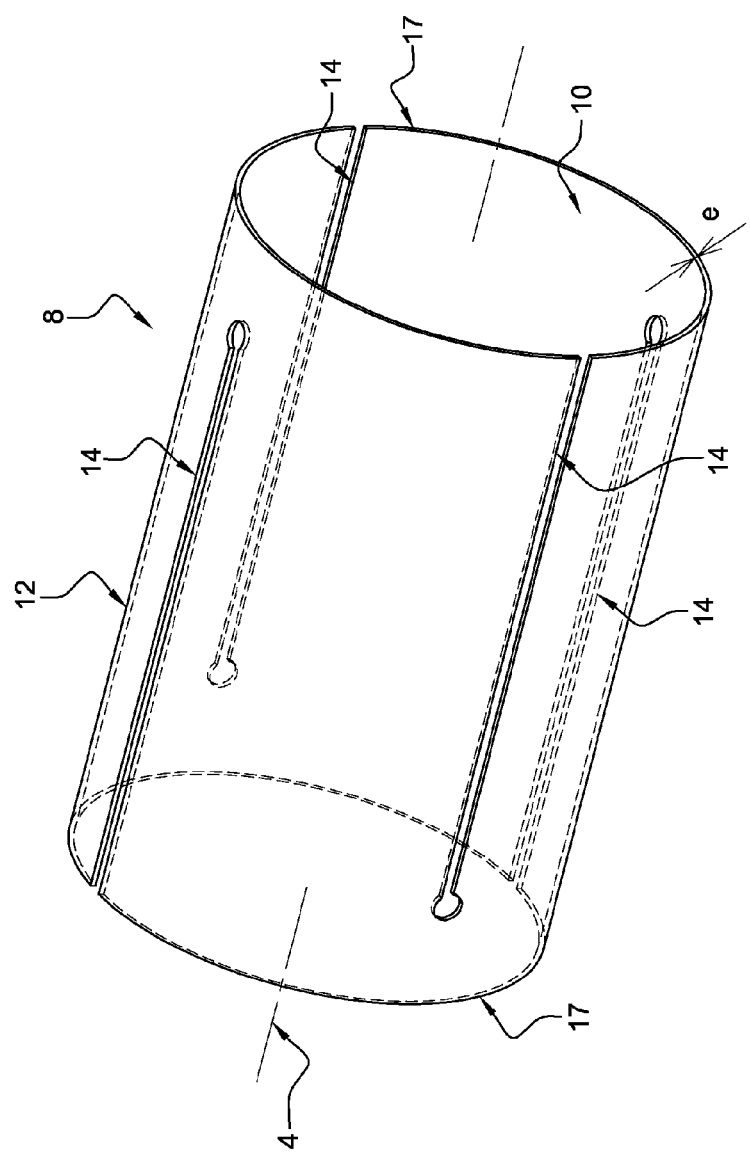
FIG. 8 is a perspective view illustrating an alternative embodiment of one of the securing members of the screw.

Illustrated in FIG. 8 is a variant embodiment of the securing members 8. As previously mentioned, the member 8 exhibits an internal cylindrical face 10 and an external frustoconical face 12, both coaxial. The member 8 exhibits in the present example four splits or longitudinal rectilinear grooves 14 passing radially through the thickness of the wall of the member and parallel to the axial direction. The splits are regularly distributed around the axis 4. They extend alternately from the respective axial edges 17 of the member, but without opening onto the opposite edge. The splits are thus distributed in pairs, the splits of each pair being diametrically opposed and extending from the same edge of the axial extremity of the member. The four splits have the same form and the same dimensions. Each extends for a fraction of the length of the member greater than 50% of this length, and even in the present case greater than 75% and 80% of this length. The blind extremity of each split, that is to say the extremity which does not open onto an edge of the axial extremity of the sleeve, exhibits a configuration in the form of the arc of a circle in order to avoid the appearance of a fracture initiation in the material at this point. The member 8 is particularly extensible in the radial direction.

Independently of these characteristics relating to the form, disposition and number of splits, the said member exhibits a largest wall thickness of less than 10 mm and even less than 3 mm. The thickness of the wall in the present case lies in the range from 0.5 to 1.2 mm because of the frustoconical shape of the external face. It is advantageous to stipulate the same dimensional conditions for the members 8 of the embodiment in the preceding figures. This relatively small wall thickness facilitates the transmission of the tightening forces between the support and the sleeve.

It should be noted that, in the preceding examples, each sleeve is secured directly to the corresponding member but without their being connected one to the other by an intermediate fastening element. The only additional members which may possibly be necessary are those which permit this securing to be produced and to be undone.

The invention is particularly well adapted to the extrusion and to the mixing of plastic products, of which certain ones at least are synthetic.

Numerous modifications can, of course, be made to the invention without departing from the ambit thereof.

Described above are examples in which the one or more splits are rectilinear and parallel to an axis of the screw. However, the split or the splits could be given other forms and/or other dispositions. For example, provision could be made for the split or each individual split to exhibit a helicoidal form, the axis of the helix being the axis 4.

What is claimed is:

1. A screw intended for the extrusion or mixing of elastomers or plastic products, comprising:
    a support,
    at least one sleeve having at least one relief projecting from an external face of the sleeve, and
    at least one piece split annular securing member, the member being tightened between the sleeve and the support in a radial direction with respect to an axis of the screw so as to secure the sleeve rigidly to the support, the member and the sleeve having frustoconical faces in mutual contact.

2. The screw according to claim 1, in which the sleeve, or at least one of the sleeves, exhibits a wall thickness smaller than or equal to 10 mm.

3. The screw according to claim 1, in which the member or the one at least of the securing members is split in a parallel direction with respect to a principal axis of the member.

4. The screw according to claim 1, in which the securing member exhibits at least two splits.

5. The screw according to claim 4, in which the splits or at least two of the splits extend from respective different end edges of the member.

6. The screw according to claim 1, in which the member exhibits a total length lower than a total length of the sleeve.

7. The screw according to claim 1, in which the securing member is in contact with the sleeve via a single frustoconical contact face of the member.

8. A device for the extrusion or mixing of elastomers or plastic products, comprising a screw according to claim 1.

9. The screw according to claim 2, wherein the wall thickness is smaller than or equal to 3 mm.

10. The screw according to claim 4, wherein the securing member exhibits at least four splits.

* * * * *